United States Patent Office 3,352,852
Patented Nov. 14, 1967

3,352,852
SYNTHETIC PENICILLINS
Lee C. Cheney, Fayetteville, N.Y., assignor, by mesne assignments, to Beecham Group Limited, Brentford, Middlesex, England, a corporation of Great Britain and Northern Ireland
No Drawing. Application Dec. 20, 1962, Ser. No. 245,982, which is a division of application Ser. No. 847,874, Oct. 22, 1959. Divided and this application Feb. 14, 1966, Ser. No. 527,111
3 Claims. (Cl. 260—239.1)

This application is a continuation-in-part of my prior, copending application Ser. No. 815,287 filed May 25, 1959, and is also a division of my prior, copending application Ser. No. 245,982 filed Dec. 20, 1962, now abandoned which was in turn a division of my prior, then copending application Ser. No. 847,874 filed Oct. 22, 1959, now abandoned as a continuation-in-part of said application Ser. No. 815,287 and now abandoned.

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to substituted 6-(2-phenoxypropion-amido)penicillanic acids and nontoxic salts thereof.

Antibacterial agents such as benzylpenicillin have proved highly effective in the past in the therapy of infections due to Gram-positive bacteria but such agents suffer from the serious drawbacks of being unstable in aqueous acid, e.g. upon oral administration, and of being ineffective against numerous so-called resistant strains of bacteria, e.g. penicillin-resistant strains of *Staphylococcus aureus* (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzyl-penicillin-resistant strains of bacteria or inhibit benzyl-penicillinase and thus potentiate the action of benzyl-penicillin when admixed therewith.

There is provided, according to the present invention, a member selected from the group consisting of an acid having the formula

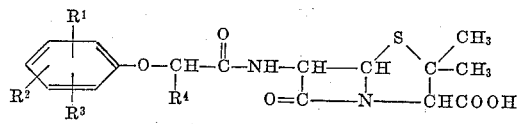

wherein $R^1$, $R^2$ and $R^3$ are each members selected from the group consisting of hydrogen, nitro, amino, (lower) alkylamino, di(lower)alkylamino, acylamino (where the acylating acid is an aliphatic carboxylic acid containing from one to ten carbon atoms inclusive and the substituent may thus also be named (lower) alkanoylamino), (lower) alkyl, chloro, bromo, iodo, (lower)alkoxy, hydroxy, sulfamyl, benzyl and trifluoromethyl and $R^4$ represents a member selected from the group consisting of lower alkyl (including, both here and above, straight and branched chain saturated aliphatic groups containing from one to ten carbon atoms inclusive), phenyl and phenylalkyl (including benzyl and α- and β-phenethyl and α-, β- and γ-phenylpropyl) and nontoxic salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N, N'-dibenzylethylenediamine, dehydroabietylamine, N,N'-bis-dehydroabietylethylenediamine, and other amines which have been used to form salts with benzylpenicillin. Also included within the scope of the present invention are easily hydrolyzed esters which are converted to the free acid form by chemical or enzymatic hydrolysis.

The products of the present invention are prepared by reaction of 6-aminopenicillanic acid, preferably in the form of a neutral salt such as the sodium salt or the triethylamine salt, with an acid chloride having the formula

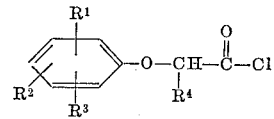

wherein $R^1$, $R^2$, $R^3$ and $R^4$ have the meaning set forth above, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

Thus, an elegant procedure for preparing a compound of the present invention by way of a mixed anhydride with ethoxy- or isobutoxy-carbonic acid comprises mixing 0.01 mole of an acid (whose acid chloride is set forth above), 0.01 mole isobutyl chloroformate and 0.011 mole tertiary hydrocarbonyl or aliphatic amine such as triethylamine in an anhydrous, inert and preferably water-miscible solvent such as p-dioxane (e.g., 20 ml.) and if desired 2 ml. pure, dry acetone for about thirty minutes in the cold, e.g., at about 4° C. To this solution of the mixed anhydride there is then added a chilled solution of 0.01 mole 6-aminopenicillanic acid and 0.01 mole tertiary hydrocarbonyl amine, e.g., triethylamine, in, for example, 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold under a layer of ether by the addition of dilute mineral acid, e.g., 5 N $H_2SO_4$ to pH 2. The free acid is then extracted into a water-immiscible, neutral organic solvent such as ether and the extract is washed with water quickly in the cold, if desired, and then dried, as with anhydrous $Na_2SO_4$. The product in the ethereal extract in its free acid form is then converted to any desired metal or amine salt by treatment with the appropriate base, e.g., a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of a compound of the present invention comprises preparing a solution in 20 ml. of water of 0.00463 mole 6-aminopenicillanic acid and 1.56 gm. sodium bicarbonate, adding 0.00476 mole of an acid chloride whose formula is set forth above and shaking vigorously at room temperature, e.g., for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g., two portions of 25 ml.). This ethereal extract is dried, as with anhydrous sodium sulfate, and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by an equimolar amount of the corresponding acid bromide or acid anhydride.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is of course advisable when more than one phase is present, e.g., solid and liquid or two liquid phases.

At the conclusion of the reaction, the products are isolated if desired by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization, or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

When an acid chloride, an acid bromide or an acid anhydride is used in a process of the present invention, it is prepared from the corresponding acid according to the techniques set forth in the literature for acids such as phenylacetic acid and phenoxyacetic acid. In any instances where the substituted α-phenoxyalkanoic acid has not been described, it is prepared from the appropriately substituted phenol and the appropriate α-chloro- or α-bromo-acid by the methods described in the art for phenoxyacetic acid or substituted phenoxyacetic acids or described or referred to in U.S. Patents 2,854,450 and 2,479,297.

*Preparation of α-aryloxyalkanoic acids*

In the preparation of α-aryloxyalkanoic acids, four different methods have been used: A, B, C and D.

Methods A and B are believed to be general for the preparation of α-aryloxyalkanoic acids from unhindered phenols and α-haloalkanoic acids. The α-bromoalkanoic acids are more frequently used, but the α-chloroalkanoic acids are found to work equally well. Of the two methods, A is to be preferred over B.

When α-halo esters are used instead of α-haloalkanoic acids, and where the phenols are highly hindered, Methods C and D should be used. Often the reaction time is shorter and the yields higher when C and D are used for the preparation of unhindered α-aryloxyalkanoic acids from the corresponding α-halo esters. It is interesting to note that in cases of very highly hindered phenols, as in 2,6-diisopropylphenol, Method C gives the best result.

No attempt was made to find conditions for optimum yields except in the preparation of α-phenoxypropionic acid, where a better yield is obtained when excess phenol is used (Method A).

In the recrystallization of the acids most of the common organic solvents have been tried. It was found that isopropyl alcohol-water, benzene-lower alkanes (Skelly C or B) work best for most of the acids. One recrystallization from these mixed solvents is usually enough to give a product of analytical purity, provided the starting materials are of good quality. In cases where the acids cannot be crystallized, they are distilled under high vacuum.

The details of these four methods are as follows:

*Method A.*—0.4 mole of phenol (it was found that a better yield was obtained in the preparation of α-phenoxypropionic acid when an excess of phenol was used) and 0.2 mole of an α-haloalkanoic acid were dissolved together in 90 ml. ethanol and an ice-cooled solution of 0.5 mole sodium hydroxide in 30 ml. water was carefully added. The mixture was then heated under reflux on a steam bath for 22 hours.

The ethanol was completely removed under reduced pressure. The residue was transferred to an Erlenmeyer flask containing 200 ml. of water, and dilute hydrochloric acid was added until the solution was strongly acid (pH 2). The precipitated acid was then taken up in ether and extracted with a 5% sodium bicarbonate solution, which was then heated gently on a steam bath under reduced pressure to remove the dissolved ether. On acidification with dilute hydrochloric acid in excess, the phenoxy-acid was obtained as a crystalline precipitate. The yield of the crude acid was usually 50–85% of the theoretical value. One recrystallization from an appropriate solvent usually gave a product of analytical purity.

*Method B.*—To 0.5 mole of an α-haloalkanoic acid was added slowly in an ice bath 0.5 mole sodium hydroxide in 125 ml. H$_2$O.

A phenol (0.5 mole) was dissolved in a cooled solution of 0.5 mole sodium hydroxide in 125 ml. H$_2$O. To this sodium phenolate solution was added all at once the aqueous solution of the acid salt and the mixture was heated on a steam bath for 20 hours. The solution was cooled to room temperature, strongly acidified wtih dilute hydrochloric acid, cooled in an ice bath for an hour and the precipitated oily acid was dissolved in ether. The ether layer was separated and extracted with a 5% sodium bicarbonate solution, acidified with an excess of dilute hydrochloric acid, and the crystalline precipitate was collected by suction. One recrystallization from an appropriate solvent would usually give a product of analytical purity.

*Method C.*—Into a 1-liter 3-necked flask equipped with a mechanical stirrer, a reflux condenser above a Dean-Stark water trap, and a dropping funnel were placed 0.2 mole of a phenol, 250 ml. of toluene and 0.25 mole of flake sodium hydroxide (Mallinckrodt). The stirred mixture was heated to boiling and maintained under reflux until 3.3 ml. of water (theory 3.6 ml.) had collected in the trap. Ethyl α-haloalkanoate (0.025 mole) was then added dropwise at such a rate that the reaction was maintained under moderate reflux. The mixture was then boiled overnight under reflux.

The mixture was cooled below 10° C. and 40 ml. of methanol and a solution of 0.3 mole of sodium hydroxide in 50 ml. of water were added consecutively. To complete the saponification the stirred mixture was heated under vigorous reflux for two hours. The hot alkaline mixture was then diluted by the addition of 250 ml. of water. The alkaline aqueous layer was separated and strongly acidified with dilute sulfuric acid. The precipitated oily acid was caused to crystallize by chilling in an ice bath while stirring the mixture with a glass rod. The product was collected by suction and washed with 50 ml. of cold water. One recrystallization from an appropriate solvent was usually enough to afford a product of analytical purity, provided the starting materials were of good quality.

*Method D.*—A solution of 0.156 mole of sodium, 0.156 mole of ethyl α-haloalkanoate and 0.156 mole of a phenol in 120 ml. absolute ethanol was refluxed for four hours. Then 120 ml. of a 2 normal sodium hydroxide solution was added and the reflux was continued for another hour. The ethanol was distilled off and the residue acidified with dilute hydrochloric acid. An oil separated which soon solidified. The crude acid was taken up in ether and extracted with a 5% sodium bicarbonate solution. The sodium bicarbonate layer was separated and strongly acidified (pH 2) with dilute hydrochloric acid. The precipitated acid was collected by suction and washed with 50 ml. of cold water. Usually one recrystallization was enough to give product of analytical purity provided the starting materials are of good quality.

In the table below are listed numerous examples of α-aryloxyalkanoic acids prepared by one or more of these methods.

| Compound | Method | M.P. or B.P. in ° C. | Yield, percent | Reference |
|---|---|---|---|---|
| 2,4-dimethylphenoxy compound (CH₃, CH₃ on ring, O—CHCO₂H with CH₃) | B | 118–119 | 41 | Harvill, Zimmerman, Hitchcock; Contrib. Boyce Thompson Inst. 13, 273–80 (1944); C.A. 48, 4009g. |
| 4-chloro-2-methylphenoxy compound (Cl, CH₃ on ring, O—CHCO₂H with CH₃) | B | 136–138 | 37 | Synerholm and Zimmerman; Contrib. Boyce, Thompson Inst., 14, 91–103 (1945); C. A. 40, 14743. |
| CH₃CONH—C₆H₄—O—CHCO₂H with CH₃ | B | 176–177 | 67 | |
| CH₂CH=CH₂ substituted phenoxy, O—CHCO₂H with CH₃ | B | | | |
| CF₃ substituted phenoxy, O—CHCO₂H with CH₃ | B | (101–105/0.15 mm.) | | |
| C₆H₅—O—CHCO₂H with CH₂CH₂CH₃ | B / C | 114.5–116 | 31 / 85 | |
| C₆H₅—O—CHCO₂H with CH(CH₃)₂ | D | 72–73 | 25 | |
| CH₃O—C₆H₄—C(O)—C₆H₄—O—CHCO₂H with CH₃ | C | 130–131.5 | 31 | |
| Cl—C₆H₄—O—CHCO₂H with CH₃ and CH₂C₆H₅ | C | 115–116 | 46 | |
| 2-naphthyl—O—CHCO₂H with CH₃ | C | 148–149 | 40 | Fawett, Osborne, Dain and Walker; Ann. Appl. Biol., 40, 231–43 (1953) cf. C.A. 45, 10316f. |

| Compound | Method | M.P. or B.P. in ° C. | Yield, percent | Reference |
|---|---|---|---|---|
| (phenylthio-phenyl)–O–CH(CH$_3$)CO$_2$H | C<br>A | 125.5–126<br>125–126 | 52<br>63 | |
| (tert-pentyl-phenyl)–O–CH(CH$_3$)CO$_2$H [CH$_3$CH$_2$C(CH$_3$)$_2$–] | C | (170–173°/1–15 mm.) | 33 | |
| HO–C$_6$H$_4$–O–CH(CH$_3$)CO$_2$H | C, D | | | H. Sobotka and J. Austin; J. Amer. Chem. Soc. 74, 3813, (1952). |
| (2,3,4,5,6-pentachlorophenyl)–O–CH(CH$_3$)CO$_2$H | C | 173.5–174.5 | 60 | |
| (2,6-dimethoxyphenyl)–O–CH(CH$_3$)CO$_2$H | C | (156–158°/0.3 mm.) | 36 | |
| (2-chloro-4-phenyl-phenyl)–O–CH(CH$_3$)CO$_2$H | C | 145–146 | 61 | |
| (2,6-diisopropylphenyl)–O–CH(CH$_3$)CO$_2$H | C | (129–132°/0.15 mm.) | 38 | SS |
| (4-nitrophenyl)–O–CH(CH$_3$)CO$_2$H | C<br>B | 139–140.5<br>140–141 | 19<br>21 | |
| (2-nitro-4-trifluoromethylphenyl)–O–CH(CH$_3$)CO$_2$H | C<br>A | 90–92<br>90–91.5 | 21<br>60 | |
| C$_6$H$_5$–O–CH(CH$_3$)CO$_2$H | A | 116–116.5 | 80 | A. Fredga and M. Matell Arkiv. Kemi. 3 (nr. 20), 325 (1951). |
| Cl–C$_6$H$_4$–O–CH(CH$_3$)CO$_2$H | A | 115–116 | 54 | Fawett, Osborne, Wain and Walker; Ann. Appli. Biol. 40, 231–43, (1953). |
| C$_6$H$_5$–O–CH(CH$_2$CH$_3$)CO$_2$H | A | 82–83 | 69 | Fawett, Osborne, Wain and Walker; Ann. Appli. Biol. 40, 231–43, (1953). |
| CH$_3$O–C$_6$H$_4$–O–CH(CH$_3$)CO$_2$H | B | 92–93 | 63 | H. Sobotka and J. Austin; J. Amer. Chem. Soc. 74, 3813 (1953). |

6-aminopenicillanic acid is prepared according to Batchelor et al. (Nature 183, 257, 258, Jan. 24, 1949) or Belgian Patent 569,728. It is used in the above reaction as the salt of a metal or a tertiary hydrocarbonyl amine or as an ester of a hydrocarbonyl alcohol.

Hydrocarbonyl alcohols and tertiary hydrocarbonyl amines are compounds having the formulae

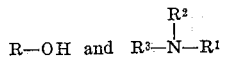

$$R-OH \quad \text{and} \quad R^3-\underset{\underset{R^1}{|}}{\overset{\overset{R^2}{|}}{N}}-R^1$$

wherein the R groups contain only the elements carbon and hydrogen.

The following examples will serve to illustrate this invention without limiting it thereto.

EXAMPLE 1

Triethylamine (1.5 ml.) was added to a cold solution (10° C.) of an α-phenoxypropionic acid (1.66 gm., 0.01 mole) in 15 ml. pure dioxane. The resulting clear solution was stirred and cooled to 5–10° C. while isobutyl chloroformate (1.36 gm., 0.01 mole) in 5 ml. dioxane was added dropwise. When the addition had been completed the mixture was stirred at 5–8° C. during ten minutes and then a solution of 6-aminopenicillanic acid (2.16 gm., 0.01 mole) in 15 ml. water and 2 ml. triethylamine was added dropwise while the temperature was maintained below 10° C. The resulting mixture was stirred in the cold during 15 minutes and then at room temperature for 30 minutes, diluted with 30 ml. cold water and extracted with ether which was discarded. The cold aqueous solution was then covered with 75 ml. ether and acidified to pH 2 with 5 NH$_2$SO$_4$. After shaking, the ether layer containing the product, 6-(2-phenoxypropionamido)penicillanic acid, was dried for ten minutes over anhydrous $Na_2SO_4$ and filtered. Addition of 6 ml. of dry n-butanol containing 0.373 gm./ml. potassium 2-ethylhexanoate precipitated the potassium salt of the product as a colorless oil which crystallized on stirring and scratching and was collected, dried in vacuo and found to weight 2.75 gm., to melt at 217–219° C., to be very soluble in water, to contain the $\beta$-lactam structure as shown by infrared analysis and to inhibit *Staph. aureus* Smith at a concentration of 0.07 mcg./ml.

EXAMPLE 2

$\alpha$-(2,4-dichlorophenoxy)propionic acid (0.01 mole), triethylamine (0.011 mole) and isobutyl chloroformate (0.01 mole) are stirred in 20 ml. pure, dry dioxane and 2 ml. dry acetone for about thirty minutes at about 4° C. To this solution there is then added a chilled solution of 6-aminopenicillanic acid (0.01 mole) and triethylamine (0.01 mole) in 20 ml. water and the mixture is stirred about an hour in the cold. After the addition of 1.0 gm. $NaHCO_3$ in 30 ml. cold water, the solution is extracted twice with 75 ml. portions of ether and the ethereal extract is discarded. The aqueous solution is cooled and stirred in an ice bath, covered with 75 ml. ether and adjusted to pH 2 with 5 N $H_2SO_4$. The ether is separated and the aqueous solution is again extracted with 75 ml. ether. The combined ethereal extracts containing the product, 6-[$\alpha$-(2,4-dichlorophenoxy)propionamido]pencillanic acid, are dried rapidly over anhydrous $Na_2SO_4$ and filtered. The addition of 6 ml. of dry n-butanol containing 0.373 gm./ml. potassium 2-ethylhexanoate followed by additional dry ether precipitates the potassium salt of the product. After trituration with ether, this potassium salt of the product is dried in vacuo over $P_2O_5$ and recovered as a water-soluble powder which inhibits the growth of *Staph. aureus* Smith at a concentration of 0.001 percent by weight.

EXAMPLE 3

$\alpha$-(2,4-diisoamylphenoxy)-n-butyric acid (0.02 mole), triethylamine (0.021 mole) and isobutyl chloroformate (0.02 mole) are stirred in 40 ml. pure, dry dioxane and 40 ml. dry acetone for about thirty minutes at about 4° C. To this solution there is then added a chilled solution of 6-aminopenicillanic acid (0.02 mole) and triethylamine (0.02 mole) in 40 ml. water and the mixture is stirred about an hour in the cold. After the addition of 2.0 gm. $NaHCO_3$ in 60 ml. cold water, the solution is extracted twice with 150 ml. portions of ether and the ethereal extract is discarded. The aqueous solution is cooled and stirred in an ice-bath, covered with 150 ml. ether and adjusted to pH 2 with 5 N $H_2SO_4$. The ether is separated and the aqueous solution is again extracted with 150 ml. ether. The combined ethereal extracts containing the product, 6-[$\alpha$-(2,4-diisoamylphenoxy)-n-butyramido]pencillanic acid, are dried rapidly over anhydrous $Na_2SO_4$ and filtered. The addition of 12 ml. of dry n-butanol containing 0.373 gm./ml. potassium 2-ethylhexanoate followed by additional dry ether precipitates the potassium salt of the product. After trituration with ether, this potassium salt of the product is dried in vacuo over $P_2O_5$ and recovered as a water-soluble powder which inhibits the growth of *Staph. aureus* Smith at a concentration of 0.001 percent by weight.

EXAMPLE 4

$\alpha$-(2,4-dichlorophenoxy)-n-butyric acid (0.04 mole), triethylamine (0.044 mole) and isobutyl chloroformate (0.04 mole) are stirred in 80 ml. pure, dry dioxane and 8 ml. dry acetone for about thirty minutes at about 4° C. To this solution there is then added a chilled solution of 6-aminopenicillanic acid (0.04 mole) and triethylamine (0.04 mole) in 80 ml. water and the mixture is stirred about an hour in the cold. After the addition of 4.0 gm. $NaHCO_3$ in 120 ml. cold water, the solution is extracted twice with 300 ml. portions of ether and the ethereal extract is discarded. The aqueous solution is cooled and stirred in an ice bath, covered with 300 ml. ether and adjusted to pH 2 with 5 N $H_2SO_4$. The ether is separated and the aqueous solution is again extracted with 300 ml. ether. The combined ethereal extracts containing the product, 6-[$\alpha$-(2,4-dichlorophenoxy)-n-butyramido]penicillanic acid, are dried rapidly over anhydrous $Na_2SO_4$ and filtered. The addition of 24 ml. of dry n-butanol containing 0.373 gm./ml. potassium 2-ethylhexanoate followed by additional dry ether precipitates the potassium salt of the product. After trituration with ether, this potassium salt of the product is dried in vacuo over $P_2O_5$ and recovered as a water-soluble powder which inhibits the growth of *Staph. aureus* Smith at a concentration of 0.001 percent by weight.

EXAMPLE 5

$\alpha$ - (4 - trifluoromethylphenoxy)-n-butyric acid (0.01 mole), triethylamine (0.011 mole) and isobutyl chloroformate (0.01 mole) are stirred in 20 ml. pure, dry dioxane and 2 ml. dry acetone for about thirty minutes at about 4° C. To this solution there is then added a chilled solution of 6-aminopenicillanic acid (0.01 mole) and triethylamine (0.01 mole) in 20 ml. water and the mixture is stirred about an hour in the cold. After the addition of 1.0 gm. $NaHCO_3$ in 30 ml. cold water, the solution is extracted twice with 75 ml. portions of ether and the ethereal extract is discarded. The aqueous solution is cooled and stirred in an ice-bath, covered with 75 ml. ether and adjusted to pH 2 with 5 N $H_2SO_4$. The ether is separated and the aqueous solution is again extracted with 75 ml. ether. The combined ethereal extracts containing the product, 6-[$\alpha$-(4-trifluoromethylphenoxy)-n-butyramido]penicillanic acid, are dried rapidly over anhydrous $Na_2SO_4$ and filtered. The addition of 6 ml. of dry n-butanol containing 0.373 gm./ml. potassium 2-ethylhexanoate followed by additional dry ether precipitates the potassium salt of the product. After trituration with ether, this potassium salt of the product is dried in vacuo over $P_2O_5$ and recovered as a water-soluble powder which inhibits the growth of *Staph. aureus* Smith at a concentration of 0.001 percent by weight.

EXAMPLE 6

$\alpha$-(4-benzylphenoxy)propionic acid (0.02 mole), triethylamine (0.022 mole) and isobutyl chloroformate (0.02 mole) are stirred in 40 ml. pure, dry dioxane and 4 ml. dry acetone for about thirty minutes at about 4° C. To this solution there is then added a chilled solution of 6-aminopenicillanic acid (0.02 mole) and triethylamine (0.02 mole) in 40 ml. water and the mixture is stirred about an hour in the cold. After the addition of 2.0 gm. $NaHCO_3$ in 60 ml. cold water, the solution is extracted twice with 150 ml. portions of ether and the ethereal extract is discarded. The aqueous solution is cooled and stirred in an ice-bath, covered with 150 ml. ether and adjusted to pH 2 with 5 N $H_2SO_4$. The ether is separated and the aqueous solution is again extracted with 150 ml. ether. The combined ethereal extracts containing the product, 6 - [$\alpha$ - (4-benzylphenoxy)propionamido] penicillanic acid, are dried rapidly over anhydrous $Na_2SO_4$ and filtered. The addition of 12 ml. of dry n-butanol containing 0.373 gm./ml. potassium 2-ethylhexanoate followed by additional dry ether precipitates the potassium salt of the product. After trituration with ether, this potassium salt of the product is dried in vacuo over $P_2O_5$ and recovered as a water-soluble powder which inhibits the growth of *Staph. aureus* Smith at a concentration of 0.001 percent by weight.

EXAMPLE 7

In the procedure of Example 1, the $\alpha$-phenoxypropionic acid is replaced by 0.10 mole $\alpha$-(2-chlorophenoxy)propionic acid, $\alpha$-(p-sulfamylphenoxy)-n-butyric acid, $\alpha$-

(3,4-dimethoxyphenoxy)-n-pentanoic acid, α-(3-methylphenoxy)-iso-valeric acid, α-(4-dimethylaminophenoxy)-n-hexanoic acid, α-(2-methoxyphenoxy)-n-decanoic acid, α - (2,4-dichlorophenoxy)phenylacetic acid, α-(2-nitrophenoxy) - β - phenylpropionic acid, α-(2-acetamidophenoxy)-γ-phenylbutyric acid, α-(2,4-dimethylphenoxy)-n-butyric acid, α-(4-isopropylphenoxy)propionic acid, α-(3-bromophenoxy)-n-butyric acid, α-(2-iodophenoxy) phenylacetic acid, α-(2-ethylaminophenoxy)- iso-valeric acid, α - (2,5 - dihydroxyphenoxy)-iso-hexanoic acid, α-(4-hydroxyphenoxy)propionic acid, α-phenoxy-iso-valeric acid, α-phenoxy-n-decanoic acid, α-phenoxy-γ-phenylbutyric acid, α-(2-benzylphenoxy)-n-butyric acid, α-(2-trifluoromethylphenoxy)propionic acid, and α-(4-aminophenoxy)propionic acid, respectively, to produce the acids 6-[α-(2-chlorophenoxy)propionamido]penicillanic acid,
6-[α-(4-sulfamylphenoxy)-n-butyramido]pencillanic acid,
6-[α-(3,4-dimethoxyphenoxy)-n-pentanoamido]pencillanic acid,
6-[α-(3-methylphenoxy)-iso-valeramido]pencillanic acid,
6-[α-(4-dimethylaminophenoxy)-n-hexanoamido]penicillanic acid,
6-[α-(2-methoxyphenoxy)-n-decanoamido]penicillanic acid,
6-[α-(2,4-dichlorophenoxy)phenylacetamido]penicillanic acid,
6-[α-(2-nitrophenoxy)-β-phenylpropionamido]penicillanic acid,
6-[α-(2-acetamidophenoxy)-γ-phenylbutyramido]penicillanic acid,
6-[α-(2,4-dimethylphenoxy)-n-butyramido]penicillanic acid,
6-[α-(4-isopropylphenoxy)propionamido]penicillanic acid,
6-[α-(3-bromophenoxy)-n-butyramido]penicillanic acid,
6-[α-(2-iodophenoxy)phenylacetamido]penicillanic acid,
6-[α-(2-ethylaminophenoxy)-iso-valeramido]penicillanic acid,
6-[α-(2,5-dihydroxyphenoxy)-iso-hexanoamido]penicillanic acid,
6-[α-(4-hydroxyphenoxy)propionamido]penicillanic acid,
6-[α-phenoxy-iso-valeramido]penicillanic acid,
6-[α-phenoxy-n-decanoamido]penicillanic acid,
6-[α-phenoxy-γ-phenylbutyramido]penicillanic acid,
6-[α-(2-benzylphenoxy)-n-butyramido]penicillanic acid,
6-[α-(2-trifluoromethylphenoxy)propionamido]penicillanic acid, and
6-[α-(4-aminophenoxy)propionamido]penicillanic acid, respectively, which are isolated as their solid, water-soluble potassium salts and found to inhibit *Staph. aureus* Smith at concentrations of 0.001 percent by weight.

EXAMPLE 8

To a cooled, stirred solution of α-phenoxyphenylacetic acid (6.8 g., 0.03 mole) in 40 ml. pure dry dioxane there was added dropwise 4.2 ml. (3.0 g., 0.03 mole) triethylamine (4.2 ml.) in 25 ml. water. The reaction mixture isobutyl chloroformate (4.1 ml., 4.1 g., 0.03 mole). After stirring 15 minutes and lowering the temperature to about 8° C. there was added over ten minutes a solution of 6-aminopencillanic acid (6.2 g., 0.03 mole) and triethylamino (4.2 ml.) in 25 ml. water. The reaction mixture was stirred at about 0° C. for 15 minutes and then for 20 minutes with the ice bath removed. After adding 40 ml. ice water, the reaction mixture was twice extracted with ether which was discarded. The aqueous phase was covered with ether, adjusted to pH 2 with 5 N $H_2SO_4$ and twice extracted into 100 ml. ether. The combined ethereal extracts containing the product, 6-(α-phenoxyphenylacetamido)pencillanic acid, were washed once with cold water, dried quickly over anhydrous sodium sulfate and filtered. The addition of 15 ml. of dry n-butanol containing 0.373 g./ml. potassium 2-ethylhexanoate precipitated the potassium salt of the product as a gum which was dissolved in methyl isobutyl ketone. Addition of about twenty volumes of dry ether precipitated this salt as an amorphous white solid which was collected, dried in vacuo over $P_2O_5$ and found to weigh 11.0 g., M.P. 88–95° C., decomposed at 120–125° C., to contain the β-lactam ring as shown by infrared analysis and to inhibit *Staph. aureus* Smith at a concentration of 0.2 mcg./ml.

EXAMPLE 9

α-(p-Tert.-butylphenoxy)propionic acid (0.03 mole, 6.68 g.), triethylamine (4.22 ml., 0.03 mole) and isobutyl chloroformate (3.9 ml., 0.03 mole) were dissolved at 0–3° C. in 40 ml. pure, dry dioxane and 5 ml. acetone and the solution was stirred twenty minutes. There was then added a solution chilled to 0–3° C. of 6-aminopenicillanic acid (6.5 g., 0.03 mole) and triethylamine (4.22 ml., 0.03 mole) in 40 ml. water and the reaction mixture was stirred for one hour. The mixture was adjusted to pH 8 with 10% aqueous $NaHCO_3$ and extracted with ether, which was discarded. The aqueous phase was covered with ether, acidified with 6 N HCl to pH 2 and twice extracted with ether. The combined ethereal extracts containing the product, 6-[α-(p-tert.-butylphenoxy)propionamido]penicillanic acid, were washed with cold water, dried over anhydrous $Na_2SO_4$ and filtered. The addition of 5 ml. (15 ml. would have been preferable) of 40% potassium 2-ethylhexanoate converted the product to its potassium salt which was precipitated as a white, crystalline solid upon dilution with anhydrous ether, collected by filtration, dried overnight in vacuo over $P_2O_5$ and found to weight 6.2 g., to melt at 219–220° C. with decomposition, to contain the β-lactam ring as shown by infrared analysis and to inhibit *Staph. aureus* Smith at a concentration of 0.1 mcg./ml.

EXAMPLE 10

The procedure of Example 9 was followed except that the α-(p-tert.-butylphenoxy)propionic acid was replaced by 2-(p-tert.-amylphenoxy)-n-butyric acid (7.53 g., 0.03 ml., also called α-[p-(1,1-dimethylpropyl)phenoxy]-n-butyric acid) to produce the final product, potassium 6-[α-(p-tert.-amylphenoxy)-n - butyramido]penicillanate as a solid gum (after trituration with ether) which was converted to a fine powder on drying in a vacuum desiccator over $P_2O_5$. This salt weighed 4.7 g., on heating slowly decomposed above 125° C., contained the β-lactam ring as shown by infrared analysis and was found to inhibit *Staph. aureus* Smith at a concentration of less than 10 mcg./ml.

EXAMPLE 11

6-(2-phenoxypropionamido)penicillanic acid was also conveniently prepared by direct acylation of fermentation broth (beer) followed by isolation therefrom of the penicillin as its potassium salt. Thus, a submerged aerobic fermentation of *Penicillium chrysogenum* was carried out according to the general methods for the production of penicillin G except for the omission of the usual addition of phenylacetic acid as the precursor. At the end of the fermentation the broth was filtered and its pH was adjusted to 7.5 with 10% sodium hydroxide. After cooling the filtered broth to about 10–20° C. there was added with agitation 5 moles of α-phenoxypropionyl chloride to the filtered broth for each mole of 6-aminopenicillanic acid therein as determined by analysis. The phenoxypropionyl chloride was added as a 5% solution in acetone, i.e. approximately .00031 moles of acid chloride per ml. The pH dropped during the addition of α-phenoxypropionyl chloride and, therefore, the rate of addition was kept slow enough to enable the pH to be maintained at 7.5 by the addition of 10% sodium hydroxide. The reaction mixture was then agitated at 10–20° C. for an additional 30 minutes. The reaction was presumed to be complete when the pH remained constant; this required about 10–15 minutes. To avoid contamination with acid-labile penicillins present in the broth, these were destroyed by next lowering the pH of the reaction mixture to pH 2 for 30 minutes before subsequent solvent extraction (the same result could also be obtained by originally filtering the broth at pH 2 and holding it there for 30 minutes). The acidified reaction mixture was extracted with ½ volume of methyl isobutyl ketone for 20 minutes and the methyl isobutyl ketone containing the desired 6-(2-phenoxypropionamido)penicillanic acid was separated and filtered to obtain sparkling solvent free of a separate water phase. This acid penicillin in the solvent was then converted to its potassium salt by stirring the methyl isobutyl ketone solution vigorously with 5% by volume of aqueous potassium acetate buffer having a specific gravity of 1.30 while cooling to 5–10° C. Crystallization of the product, potassium 6-(2-phenoxypropionamido)penicillanate started almost immediately and after one hour the crystalline product was collected by filtration, washed successively with methyl isobutyl ketone, dry butanol and acetone and found to be a potent, white crystalline solid.

In numerous runs by this procedure the efficiency of the activation step was generally about 80% with the remaining 6-aminopenicillanic acid accounted for in the spent broth. From activated broth to crude penicillin the activity yield was 77%. On a molar basis 0.64 mole of the new penicillin was produced per mole of 6-aminopenicillanic acid in the broth. Thus, in one series of runs 11.9 kg. of crude penicillin was produced from 5500 gallons of broth.

EXAMPLE 12

To α-(2,4-dichlorophenoxy)propionic acid (6.53 g., 0.0278 m.) dissolved in 12 ml. acetone and 60 ml. dioxane there was added 4.0 cc. (0.0280 ml.) dry triethylamine. The solution was cooled to 0° C. and there was added 3.64 cc. (0.0278 m.) isobutyl chloroformate and the mixture was stirred for 20 minutes. To this solution there was added at 5° C. a solution of 6.00 g. (0.0278 m.) of 6-aminopenicillanic acid in 60 ml. water and 4.0 cc. triethylamine. Evolution of carbon dioxide was brisk and the mixture was stirred for 90 minutes at 0–5° C. To the reaction mixture there was then added a solution of 2.0 g. sodium bicarbonate in 60 ml. water cooled to 10° C. The mixture was twice extracted with 150 cc. portions of cold ether which were discarded. After adding 10 cc. 6 N hydrochloric acid with cooling, the mixture was twice extracted with 150 cc. cold ether. The combined ethereal extracts containing the product, 6-(2,4-dichlorophenoxy-2-propionamido)penicillanic acid were washed with 50 cc. cold water, dried over anhydrous sodium sulfate and filtered. The addition of 25 cc. of dry n-butanol containing 0.373 gm./ml. potassium 2-ethylhexanoate precipitated the potassium salt of the product as a white solid which was collected by filtration, dried in vacuo over $P_2O_5$ and found to weigh 8.00 g., M.P. 203–205° C. with dec., to contain the β-lactam ring as shown by infrared analysis and to inhibit *Staph. aureus* Smith at a concentration of 0.2 mcg./ml., and to exhibit versus *Staph. aureus* Smith upon intramuscular injection in mice a $CD_{50}$ of 3 mgm./kg.

*Analysis.*—Calc'd for $C_{17}H_{17}Cl_2N_2O_5SK$: C, 43.3; H, 3.69; N, 5.94. Found: C, 41.73; H, 3.77; N, 5.10.

EXAMPLE 13

To a mixture of one liter of water and 100 ml. acetone there was added 105 g. (1.25 mole) sodium bicarbonate. After stirring for one hour in an ice bath there was added 54 g. (0.25 mole) 6-aminopenicillanic acid. This slurry was stirred for thirty minutes in an ice bath and then there was added dropwise over thirty minutes with vigorous stirring at a maximum temperature of 10° C. a solution in 100 ml. acetone of 2-phenoxypropionyl chloride (68.8 g., 0.375 mole). Methyl isobutyl ketone (400 ml.) was added and the vigorous stirring was continued for five minutes. After separating and discarding the methyl isobutyl ketone, the aqueous layer was extracted with 250 ml. portions of methyl isobutyl ketone which were also discarded. The aqueous layer was cooled, acidified to pH 2 with 40% $H_2SO_4$ in an ice bath and extracted with a total of 800 ml. methyl isobutyl ketone. The combined solvent extracts containing the product, 6-(2-phenoxypropionamido)penicillanic acid, were dried over anhydrous sodium sulfate for two hours in an ice bath and filtered. The product was then converted to its potassium salt by the addition of 100 ml. of 50% potassium 2-ethylhexanoate in n-butanol to precipitate 67 g. of crystalline potassium salt of the product.

EXAMPLE 14

Potassium 6-(2-phenoxybutyramido)penicillanate was prepared according to the procedure of Example 1 using 6-aminopenicillanic acid (21.6 g., 0.1 m.) in 100 ml. water and sufficient triethylamine to dissolve, 2-phenoxybutyric acid (18 g., 0.1 m.) in 80 ml. p-dioxane and 20 ml. pure acetone and 13.7 ml. isobutyl chloroformate. There was obtained 10.3 g. product, M.P. 175–197° C. with dec. (darkened at 170° C.) which was very soluble in water, contained the β-lactam structure as shown by infrared analysis, inhibited *Staph. aureus* Smith at a concentration of 0.05 mcg./ml. and exhibited versus *Staph. aureus* Smith upon intramuscular injection in mice a $CD_{50}$ of 1.1 mgm./kg.

*Analysis.*—Calc'd for $C_{18}H_{21}N_2O_5SK$: C, 51.8; H, 5.1. Found: C, 51.1; H, 5.49.

EXAMPLE 15

Potassium 6 - [α-(2,5-dichlorophenoxy)propionamido] penicillanate was prepared according to the general procedure of Example 1 using α-(2,5-dichlorophenoxy) propionic acid (0.1 m., 23.5 g.) in 160 ml. dimethylformamide and 14 ml. triethylamine, 6-aminopenicillanic acid (0.1 m., 21.6 g.) in 160 ml. water and 14 ml. triethylamine and isobutyl chloroformate (0.1 m., 13.7 g.). There was obtained 21.5 g. product, M.P. 200–204° C. with dec. (darkens above 190° C.) as a solid which was found to be very soluble in water, to contain the β-lactam structure as shown by infrared analysis, to inhibit *Staph. aureus* Smith at a concentration of 0.05 mcg./ml. and exhibited versus *Staph. aureus* Smith upon intramuscular injection in mice a $CD_{50}$ of 2.5 mgm./kg.

EXAMPLE 16

Potassium 6 - [α-(p-acetamidophenoxy)propionamido] penicillanate was prepared according to the procedure of Example 1 using 31 g., 0.15 m. α-(p-acetamidophenoxy)propionic acid and obtained as 27.7 g. solid, M.P. 211–215° C. dec. when put on a rapidly heating stage at 200° C. and found to be very soluble in water, to contain the β-lactam structure as shown by infrared analysis, to inhibit *Staph. aureus* Smith at a concentration of 0.4 mcg./ml. and to exhibit versus *Staph. aureus* Smith upon intramuscular injection in mice a $CD_{50}$ of 6.4 mgm./kg.

*Analysis.*—Calc'd for $C_{19}H_{22}N_3O_6SK$: C, 50.95; H, 4.70. Found: C, 50.12; H, 5.21.

An additional yield of 15.9 g. was obtained by adding more acetone to the mixture of methyl isobutyl ketone and 50% potassium 2-ethylhexanoate in butanol. This fraction melted at 223–226° C. with dec. but some melting was observed starting at about 214° C.

EXAMPLE 17

Thionyl chloride (30 ml.) was added fairly rapidly at room temperature to a cool solution of 200 ml. benzene, 1 ml. pyridine and 21 g. (0.0725 mole) α-(2-benzyl-4- chlorophenoxy)propionic acid and the mixture was refluxed for two hours and then the solvents were removed by distillation in vacuo up to 100° C. at 20 mm. The residual acid chloride was cooled and dissolved in 80 ml. acetone and added slowly to a mixture of 13 g. (0.06 mole) 6-aminopenicillanic acid in 100 ml. water containing 12.6 g. (0.15 mole) sodium bicarbonate and 20 ml. acetone. Proceeding according to Example 13, there was obtained 13.4 g. solid potassium 6-[α-(2-benzyl-4-chlorophenoxy)propionamido]penicillanate, melting at 230–231° C. with decomposition, which was soluble in water, contained the β-lactam structure as shown by infrared analysis, inhibited *Staph. aureus* Smith at a concentration of 0.4 mcg./ml., exhibited versus *Staph. aureus* Smith upon intramuscular injection in mice a preliminary $CD_{50}$ of 9 mgm./kg., and was only 26% inactivated by pH 2.5 acid under conditions which decomposed benzylpenicillin to the extent of greater than 96%, i.e. in 0.75 molar citric acid for one hour at 37° C.

EXAMPLE 18

After dissolving α-phenoxy caproic acid (M.P. 70–72° C., 13.70 g., 0.0659 m.) in 150 ml. dry dioxane and 30 ml. dry acetone and 9.28 cc. (0.0659 m.) dry triethylamine and cooling to −2° C. there was added 8.65 cc. (0.0659 m.) isobutyl chloroformate. The temperature rose to 6° C. and the mixture was stirred at 0° to −2° C. for 25 minutes. To this cold mixture there was then added a solution prepared by mixing 9.3 cc. triethylamine, 19.7 ml. water and 14.2 g. (0.0659 m.) 6-aminopenicillanic acid at 5° C. for five minutes. Carbon dioxide was evolved rapidly from the stirred mixture and the formation of the triethylamine salt of the product, 6-(α-phenoxycaproamido)penicillanic acid for 6-(α-phenoxy-n-hexanoamido) penicillanic acid, was essentially complete after twenty-five minutes at 5–8° C. After stirring for an additional thirty-five minutes there was added a cold solution of 9.8 g. $NaHCO_3$ in 260 ml. water and the mixture was twice extracted with 200 ml. cold ether which was discarded. The mixture was then acidified with 37 ml. cold 6 N $H_2SO_4$ and twice extracted with 200 ml. cold methyl isobutyl ketone. The combined solvent extracts containing the product, 6-(α-phenoxycaproamido)penicillanic acid, were washed with 15 ml. ice water, dried over $Na_2SO_4$ and filtered. The addition of 27 ml. of 50% potassium 2-ethylhexanoate in dry n-butanol converted the product to its potassium salt which was precipitated as a mobile oil after successive additions of 500 ml. dry ether and 1000 ml. lower alkanes (Skellysolve B). The product was recovered by decantation, washed four times with 400 ml. dry ether and dried in vacuo to give 22.2 g. of amorphous solid product as the potassium salt. This salt was very soluble in water, decomposed on heating at about 160° C., contained the β-lactam structure as shown by infrared analysis, inhibited *Staph. aureus* Smith at a concentration of 0.4 mcg./ml., exhibited versus *Staph. aureus* Smith upon intramuscular injection in mice a preliminary $CD_{50}$ of 4 mgm./kg. and was only 36% inactivated by pH 2.5 acid under conditions which decomposed benzylpenicillin to the extent of greater than 96% i.e. in 0.75 molar aqueous citric acid for one hour at 37° C.

EXAMPLE 19

α-(4-chloro-3,5-dimethylphenoxy)caproic acid (0.65 m., 17.6 g.) was used in the procedure of Example 18 to produce 6-[α-(4-chloro-3,5-dimethylphenoxy)caproamido]penicillanic acid which was isolated as its potassium salt in the form of a fluffy, amorphous, hygroscopic solid which weighed 10.0 g., melted at 105–108° C. with decomposition, was soluble in water, contained the β-lactam structure as shown by infrared analysis, inhibited *Staph. aureus* Smith at a concentration of 0.4 mcg./ml., exhibited versus *Stap. aureus* Smith upon intramuscular injection in mice a preliminary $CD_{50}$ of 9 mgm./kg., was only 29% inactivated by 1 u./ml. penicillinase under conditions which inactivated benzylpenicillin to the extent of 73% and was only 55% inactivated by pH 2.5 acid under conditions which decomposed benzylpenicillin to the extent of greater than 96%, i.e. in 0.75 molar aqueous citric acid for one hour at 37° C.

EXAMPLE 20

α-Phenoxy-n-valeric acid (0.1 m., 19.4 ml.) was used in the procedure of Example 18 on a 0.1 mole scale and methyl isobutyl ketone was used as the extraction solvent to produce 6 - (α - phenoxycaproamido)penicillanic acid which was isolated as its potassium salt in the form of solid weighing 17.7 g., melting at 170–175° C. with decomposition. This salt was soluble in water, containing the β-lactam structure as shown by infrared analysis, inhibited *Staph. aureus* Smith at a concentration of 0.4 mcg./ml., exhibited versus *Staph. aureus* Smith upon intramuscular injection in mice a $CD_{50}$ of 3.7 mgm./kg., was only 30% inactivated by 1 u./ml. penicillinase under conditions which inactivated benzylpenicillin to the extent of 73% and was only 13% inactivated by pH 2.5 acid under conditions which decomposed benzylpenicillin to the extent of greater than 96%, i.e. in 0.75 molar aqueous citric acid for one hour at 37° C.

EXAMPLE 21

Potassium 6 - [α - (2,4,6 - trichlorophenoxy)propionamido]-penicillanate was prepared from α-(2,4,6-trichlorophenoxy)-propionic acid (0.1 m., 27 g.) according to the procedure of Example 15 and recovered as a crystalline solid, 4.9 g., M.P. 163–165° C. with decomposition (darkens slowly above 140° C.). The product was soluble in water, contained the β-lactam structure as shown by infrared analysis, inhibited *Staph. aureus* Smith at a concentration of 0.4 mcg./ml., exhibited versus *Staph. aureus* Smith upon intramuscular injection in mice a preliminary $CD_{50}$ of 9 mgm./kg., was only 37% inactivated by 1 u./ml. penicillinase under conditions which inactivated benzylpenicillin to the extent of 58% and was only 27% inactivated by pH 2.5 acid under conditions which decomposed benzylpenicillin to the extent of greater than 96%, i.e. in 0.75 molar aqueous citric acid for one hour at 37° C.

*Analysis.*—Calc'd for $C_{17}H_{16}Cl_3KN_2O_5S$: C, 40.3; H, 3.19. Found: C, 40.8; H, 3.55.

EXAMPLE 22

Potassium 6-[α - (p - methoxyphenoxy)propionamido] penicillanate was prepared from 19.6 g. (0.1 mole) α-(p-methoxyphenoxy)-propionic acid according to the procedure of Example 15 and recovered as a white crystalline solid, 14.6 g., M.P. 211–214° C. with decomposition with darkening above 208° C. The product was soluble in water, contained the β-lactam structure as shown by infrared analysis, inhibited *Staph. aureus* Smith at a concentration of 0.1 mcg./ml., exhibited versus *Staph. aureus* Smith upon intramuscular injection in mice a preliminary $CD_{50}$ of 1.9 mgm./kg., was only 23% inactivated by 1 u./ml. penicillinase under conditions which inactivated benzylpenicillin to the extent of 58% and was only 2% inactivated by pH 2.5 acid under conditions which decomposed benzylpenicillin to the extent of greater than 96%, i.e. in 0.75 molar citric acid for one hour at 37° C.

*Analysis.*—Calc'd for $C_{18}H_{21}KN_2O_6S$: C, 49.9; H, 4.90. Found: C, 49.66; H, 5.10.

EXAMPLE 23

α - (m - Trifluoromethylphenoxy)propionic acid (0.1 m., 23.4 g) was used in the procedure of Example 18 on a 0.1 mole scale to produce 6-[α-(3-trifluoromethylphenoxy)propionamido]-penicillanic acid which was isolated as its potassium salt in the form of a white solid which weighed 11.0 g., melted at 188–190° C. with decomposition, contained the β-lactam structure as shown by infrared analysis, inhibited *Staph. aureus* Smith at a concentration of 0.1 mcg./ml. and exhibited versus *Staph. aureus* Smith upon intramuscular injection in mice a preliminary $CD_{50}$ of 1.8 mgm./kg.

EXAMPLE 24

α-(p-Nitrophenoxy)propionic acid (0.1 m., 22.1 g.) was used in the procedure of Example 18 on a 0.1 mole scale to produce 6-[α - (4 - nitrophenoxy)propionamido]penicillanic acid which was isolated as its potassium salt in the form of a solid which weighed 31.8 g., melted at 202–203° C. with decomposition, contained the β-lactam structure as shown by infrared analysis and inhibited *Staph. aureus* Smith at a concentration of 0.8 mcg./ml.

EXAMPLE 25

Potassium 6 - [α - (4 - chloro-3,5-dimethylphenoxy)-propionamido]penicillanate was prepared from 22.9 g. (0.1 m.) α - (4 - chloro-3,5-dimethylphenoxy)propionic acid according to the procedure of Example 15 and recovered as a white crystalline solid, 14.8 g., M.P. 210–213° C. with decomposition, darkening above 200° C. The product was soluble in water, contained the β-lactam structure as shown by infrared analysis and inhibited *Staph. aureus* Smith at a concentration of 1.6 mcg./ml.

*Analysis.*—Calc'd for $C_{19}H_{22}ClKN_2O_5S$: C, 49.0; H, 4.77. Found: C, 48.78; H, 4.90.

EXAMPLE 26

The potassium salts of 6 - [α - (2,4 - dibromophenoxy)propionamido]penicillanic acid, 6 - [α - (2-n-pentylphenoxy)propionamido]penicillanic acid, 6 - [α - (2,6-dimethoxyphenoxy)propionamido] - penicillanic acid, 6-[α - (2,3,4,5,6 - pentachlorophenoxy)propionamido]penicillanic acid and 6 - [α - (4 - nitro - 3 - trifluoromethylphenoxy)propionamido]penicillanic acid were prepared according to the methods described above, isolated as colorless solids and found to be soluble in water and to inhibit *Staph. aureus* Smith at the following concentrations in mcg./ml. respectively: 0.05, 0.4, 3.1, 0.1 and 0.2.

EXAMPLE 27

Potassium 6 - [α - (p - cyclohexylphenoxy)propionamido]penicillanate was prepared from α - (p - cyclohexylphenoxy)propionic acid (30 g., 0.121 mole) according to the procedure of Example 17 and found to weigh 37 g., to melt at 230–231° C. with decomposition, to contain the β-lactam structure as shown by infrared analysis and to inhibit *Staph. aureus* Smith at a concentration of 0.4 mcg./ml.

EXAMPLE 28

Potassium 6-[α-(3,5-dimethylphenoxy)propionamido]-penicillanate was prepared according to Example 18 from 19.4 g. (0.1 mole) α-(3,5-dimethylphenoxy)propionic acid and recovered as a white crystalline material, 21.5 g., M.P. 220–222° C., which contained the β-lactam structure as shown by infrared analysis and inhibited *Staph. aureus* Smith at a concentration of 0.1 mcg./ml.

EXAMPLE 29

The two diastereoisomers of 6-(α-phenoxypropionamido)penicillanic acid were prepared in the form of their potassium salts by resolving racemic α-phenoxypropionic acid using yohimbine, converting the dextro and levo isomers of the acid to the corresponding acid chlorides and then reacting each isomer with 6-aminopenicillanic acid obtained from a fermentation broth. This resolution was accomplished from the method of E. Fourneau and G. Sandulesco, Bull. Soc., Chim., Ser. 4, 31, 988–990 (1922), with some attention to the work of A. Fredga and M. Matell, Arkiv. Kemi, 4, 325–330 (1952). The final products were arbitrarily named as the alpha and beta or D- and L-isomers.

The detailed procedure for the preparation of these two isomers is given below:

*Resolution of dl α-phenoxypropionic acid using yohimbine*

(A) *Isolation of d-α-phenoxypropionic acid.*—To a mixture of 170 grams (0.435 mole) of yohimbine hydrochloride in 8.7 liters of water was added 200 ml. of ammonium hydroxide. The mixture was stirred for one hour and filtered. The yohimbine base was washed with distilled water, dried as well as possible on the filter, and transferred into 2.03 liters of hot ethanol (ca. 90°) and 8.7 liters of water. A total of 96.3 grams (.58 mole) of dl α-phenoxypropionic acid was added, the mixture was brought up to ca. 100° and nearly all the solids dissolved. The solution was filtered to remove a small amount of gummy material present as an impurity in the original acid. The filtrate was stored in the cold room overnight. In the morning dense crystals had deposited (it was found that heating of the solution on the steam bath speeded up the crystallization before storage). The salt was filtered and weighed 132 grams (crude). The filtrate was called Filtrate A. The yohimbine d-(α-phenoxypropionate) was recrystallized by dissolving in 1 liter of absolute alcohol with heating on the steam bath and diluting with 8 liters of water. After storage overnight in the cold room the solid was filtered and weighed about 75 grams, M.P. 207.5–212° C., $[\alpha]_D^{25°}+40.74°$ (c., 1 alcohol). The wet sample was slurried with 200 ml. of 5% $Na_2CO_3$ for one half hour. The mixture was filtered and the yohimbine was dried in air for three days; weight 39.5 g. The sodium carbonate solution was layered with 200 ml. of ether and concentrated hydrochloric acid was added until the pH was 2. The two layers were separated after vigorous shaking and the organic layer was washed with water and dried over anhydrous sodium sulfate. The ether was evaporated and 12 grams of d α-phenoxypropionic acid was obtained, M.P. 86.5–88° C., $[\alpha]_D^{23°}+39.12°$ (c., 1 alcohol).

(B) *Isolation of l-α-phenoxypropionic acid.*—Filtrate A was evaporated to dryness under reduced pressure on the steam bath to a white solid. The solid was stirred one hour with 300 ml. of 5% $Na_2CO_3$ solution and the yohimbine was filtered off and weighed, after drying, 88 grams. The sodium carbonate solution was layered with 200 ml. of ether and acidified to pH 2 with concentrated hydrochloric acid. The ether layer was stirred vigorously, washed with water and dried over anhydrous sodium sulfate. Upon evaporation a white solid was obtained M.P. 111–115° C. $[\alpha]_D^{23°}-8.21°$ (c., 1 alcohol). The acid weighed 20 grams. The solid was partially dissolved in 200 ml. of hot cyclohexane and filtered to give 10 g. of racemic dl α-phenoxypropionic acid M.P. 115–116° C., $[\alpha]_D^{24°}$ 0 (c., 1 alcohol). The cyclohexane was evaporated to dryness to give 5 grams of primarily l-α-phenoxypropionic acid M.P. 86–87° C. $[\alpha]_D^{24°}-36.5°$. The sample was recrystallized from 100 ml. of hot cyclohexane to give 3 grams of the levo enantiomorph, M.P. 87–88° C., $[\alpha]_D^{24°}-37.8°$ (c., 1 alcohol).

(C) *Preparation of potassium 6-(D-α-phenoxypropionamido)penicillanate (alpha isomer).*—The general procedure of Example 1 was followed using 8.3 g. (0.05 m.) of dextro-α-phenoxypropionic acid in 40 ml. p-dioxane and 20 ml. pure acetone, 10.8 g. (0.05 m.) 6-aminopenicillanic acid in 60 ml. water and 10 ml. triethylamine, 7 ml. isobutyl chloroformate and 10 ml. triethylamine to give 7.2 g. of the solid potassium salt, $[\alpha]_D^{24°}+225°$, c.=1 in water, M.P. 219–220° C. with decomposition.

This isomer was also called the alpha isomer or potassium D-α-phenoxyethylpenicillin. The alpha isomer was found to exhibit versus *Staph. aureus* Smith upon intramuscular injection in mice a $CD_{50}$ of 1.2 mgm./kg.

(D) *Preparation of potassium 6-(L-α-phenoxypropionamido)penicillanate (beta isomer).*—The above procedure was followed using 2 g. (0.012 m.) of levo-α-phenoxypropionic acid in 10 ml. p-dioxane and 5 ml. pure acetone, 2.6 g. (0.012 m.) 6-aminopenicillanic acid in 15 ml. water and 2 ml. triethylamine, 1.7 ml. (0.0121 m.) isobutyl chloroformate and 2 ml. triethylamine to give 4.6 g. of the potassium salt, $[\alpha]_D^{25°}+204°$, c.=1 in water, M.P. 221–222° C. with decomposition.

This isomer was also called the beta isomer of potassium L-α-phenoxyethylpenicillin. The beta isomer was found to exhibit versus *Staph. aureus* Smith upon intramuscular injection in mice a $CD_{50}$ of 0.6 mgm./kg.

A mixture of equal parts by weight of these alpha and beta isomers was found to exhibit versus *Staph. aureus* Smith upon intramuscular injection in ten mice a $CD_{50}$ of 0.45 mgm./kg. In other experiments it was repeatedly noted that a mixture of these isomers, whether prepared as above or by acylation of 6-aminopenicillanic acid with racemic α-phenoxypropionyl chloride, gave either a lower $CD_{50}$ than either pure isomer or a $CD_{50}$ substantially equal to that give by the more potent (beta) isomer.

Samples of potassium 6-(2-phenoxypropionamido)penicillanate prepared as in Example 11 above by acylation of broth containing 6-aminopenicillanic acid by the use of racemic α-phenoxypropionyl chloride were found by infrared analysis (in potassium bromide pellets at 13.08 and 13.18 microns) and phase solubility analysis in 95% ethanol to contain as their major element an amount of 60 to 80%±5% by weight of the beta (levo) isomer. The pure beta isomer had a solubility in 95% ethanol at room temperature of 5.5–6.0 mgm./g. of solvent and could be obtained from the mixture by successive leechings of the more soluble alpha isomer by 95% ethanol. Pure samples of the beta isomer were also obtained by dissolving in warm 95% ethanol enough of the mixture of isomers to provide slightly more than 6 mgm. beta isomer per gram of solvent and then allowing the mixture to cool to room temperature.

*Alpha D isomer* d-α-Phenoxypropionic acid (83.31 g., 0.5 mole, $[\alpha]_D^{24°}=+40°$, c.=1, $C_2H_5OH$) in 500 ml. pure dioxane and 200 ml. acetone was converted, by reaction in the usual manner with 70 g. isobutyl chloroformate and 75 ml. triethylamine and 108 g. (0.5 mole) 6-aminopenicillanic acid in 700 ml. water and sufficient triethylamine to dissolve, to the alpha isomer, potassium 6-(D-2-phenoxypropionamido)penicillanate, 134 g., $[\alpha]_D^{24°}+250°$ (1% in water), M.P. 240–241° C. with decomposition. Recrystallization of 100 g. from 1 liter n-butanol and 200 ml. water gave 61 g. material having $[\alpha]_D^{24°}+251°$, 1% in water, and decomposing on heating at 236–237° C.

An additional crop of 22 g. crystalline salt had $[\alpha]_D^{24°}+251°$ (1% in water) and decomposed at 230–231° C. Both crops were active against *S. lutea* and *Staph. aureus*.

*Beta (L) isomer*

By the same procedure on a 0.026 mole scale, levo α-phenoxypropionic acid (4.3 g., $[\alpha]_D^{23.5°}-39.5°$, c.=1 in $C_2H_5OH$) was converted to the beta isomer, potassium 6-(L-2-phenoxypropionamido)penicillanate, and recrystallized (6 g. from 100 ml. n-butanol and 20 ml. water) to give 4.75 salt exhibiting $[\alpha]_D+218°$, 1% in water.

The beta (L) isomer could also be isolated in pure form from solids prepared by broth acylation in which it was present in a ratio of 70:30 by repeated recrystallizations from n-butanol-water. Thus, 500 g. was recrystallized from three liters n-butanol and 900 ml. water to give 200 g. ($[\alpha]_D^{25°}+218°$, 1% in water, decomposition point 242–243° C.). A second recrystallization gave 125 g. $[\alpha]_D+218–221°$, 1% in water, decomposition point 245–246° C.

*Analysis.*—Calc'd for $C_{17}H_{19}N_2O_5SK$: C, 50.73; H, 4.76; N, 6.96. Found: C, 50.65; H, 4.83; N, 6.82; $H_2O$, none. A third recrystallization gave 73 g. ($[\alpha]_D^{24°}+220°$, 1% in water; decomposition point 239–240° C.).

*Microbiological studies on BL–P152*

Studies were done on the [α (D) and β (L)] diastereoisomers obtained from the reactions of D- and L-α-phenoxypropionic acid with 6-aminopenicillanic acid as well as on a mixture of the two diastereoisomers representing a typical lot produced by broth acylation with racemic acid chloride. The separated diastereoisomers will be designated as "alpha isomer" and "beta isomer" respectively, and the mixture of isomers will be designated as "mixture." Comparisons of these materials were made with penicillin V. All were in the form of potassium salts.

*Spectrum of BL–P152*

The minimum inhibitory concentration (MIC) was determined for a variety of microorganisms using serial dilution techniques. The inoculum was a $10^4$ dilution of an overnight broth culture except for those cultures which grew poorly when a $10^3$ dilution was used. The growth was read after eighteen hours at 37° C. The results are listed below in Table 1.

TABLE A.—COMPARISON OF MINIMUM INHIBITORY CONCENTRATIONS IN MCG./ML. IN HEART INFUSION BROTH

| Organism | MIC | | | |
|---|---|---|---|---|
| | Alpha Isomer | Beta Isomer | Mixture | Pen. V. |
| *Bacillus anthracis* | 0.25 | 0.06 | 0.03 | 0.03 |
| *Bacillus cereus* | 100 | 12.5 | 25 | 25 |
| *Bacillus circulans* ATCC 9961 | 6.25 | 6.25 | 6.25 | 3.1 |
| *Corynebacterium xerosis* | 0.125 | 0.06 | 0.03 | 0.03 |
| *Diplococcus pneumoniae\** | 0.06 | 0.06 | 0.06 | 0.03 |
| *Escherichia coli* ATCC 8739 | >100 | >100 | >100 | >100 |
| *Gaffkya Tetragena* | 0.03 | 0.015 | 0.015 | 0.07 |
| *Micrococcus flavus* | 0.125 | 0.015 | 0.015 | 0.007 |
| *Salmonella paratyphi* A | 50 | 25 | 25 | 12.5 |
| *Salmonella typhosa* | >100 | >100 | >100 | >100 |
| *Sarcina lutea* ATCC 10054 | 0.12 | 0.007 | 0.007 | 0.007 |
| *Shigella sonnei* | 100 | 100 | 100 | 25 |
| *Staphylococcus aureus* 209P | 0.125 | 0.06 | 0.03 | 0.03 |
| *Staphylococcus aureus* var. Smith | 0.125 | 0.03 | 0.03 | 0.03 |
| *Streptococcus agalactiae* ATCC 1077 | 0.06 | 0.03 | 0.03 | 0.03 |
| *Streptococcus dysgalactiae* ATCC 9926 | 0.06 | 0.03 | 0.03 | 0.03 |
| *Streptococcus faecalis* PCI 1305 | 45 | 6.25 | 6.25 | 25 |
| *Streptococcus pyogenes* 203\* | 0.06 | 0.06 | 0.06 | 0.15 |
| *Streptococcus pyogenes* Digonnet\* | 0.015 | 0.03 | 0.06 | 0.03 |
| *Streptococcus pyogenes* No. 2340 | 0.06 | 0.06 | 0.03 | 0.03 |
| *Streptococcus pyogenes* No. 23586 | 0.06 | 0.06 | 0.06 | 0.03 |
| *Vibrio comma* | 25 | 50 | 25 | 12.5 |

*Plus 10% serum.

Effect on resistant staphylococcal strains

When MIC's are determined against a variety of clinically isolated resistant staphylococcal strains, the inhibitory end points are invariably lower than those obtained with penicillin G or V. This is shown below in Table 2.

TABLE 2.—COMPARISON OF MINIMUM INHIBITORY CONCENTRATIONS USING PENICILLIN RESISTANT STRAINS OF S. AUREUS OF CLINICAL ORIGIN

| S. aureus Strain No. | MIC (mcg./ml.) | | | | |
|---|---|---|---|---|---|
| | Alpha Isomer | Beta Isomer | Mixture | Pen. V. | Pen. G. |
| 52-34 | 3.1 | 1.6 | 0.8 | 6.2 | 12.5 |
| 52-75 | 6.2 | 3.1 | 3.1 | 25 | 50 |
| WR188 | 3.1 | 3.1 | 1.6 | 12.5 | 12.5 |
| BRL J | 0.8 | 0.8 | 0.8 | 1.6 | 3.1 |
| BRL O | 1.6 | 0.8 | 0.8 | 12.5 | 25 |

Effect of penicillinase

The rates of inactivation of potassium 6-($\alpha$-phenoxypropionamido)penicillanate (the mixture) penicillin G, and penicillin V by *Bacillus cereus* penicillinase were determined. The results in Table 3 represent the inactivation of these penicillins by five units of Penicillinase A, SchenLabs. It will be seen that potassium 6-($\alpha$-phenoxypropionamido)penicillanate (the mixture) is considerably more resistant to *B. cereus* penicillinase than penicillin V or G.

TABLE 3.—EFFECT OF *BACILLUS CEREUS* PENICILLINASE ON DIFFERENT PENICILLINS

| Penicillin | Percent Inactivation | | | | |
|---|---|---|---|---|---|
| | 0 Min. | 15 Min. | 30 Min. | 60 Min. | 120 Min. |
| Potassium 6-($\alpha$-phenoxypropionamido)penicillanate (mixture) | 0 | 40 | 56 | 88 | 100 |
| Penicillin V | 0 | 100 | 100 | 100 | 100 |
| Penicillin G | 0 | 81 | 100 | 100 | 100 |

Acid stability studies

The stability of potassium 6-($\alpha$-phenoxypropionamido)penicillanate (mixture) was compared with penicillin V and G at three temperatures. The penicillins were dissolved in .002 M citrate buffer at pH 2 and pH 3 and the percentage decrease in activity of samples kept at 5° C., 25° C. and 37° C., was determined by plate assays. The values obtained are listed in Table 4.

The data indicate that potassium 6-($\alpha$-phenoxypropionamido)penicillanate (mixture) and pencillin V have essentially equivalent acid stability, both being considerably more stable than penicillin G.

TABLE 4.—PERCENT DECREASE IN ACTIVITY

| Temp. °C. | Hrs. | "Mixture" | | Penicillin V | | Penicillin G | |
|---|---|---|---|---|---|---|---|
| | | pH 2 | pH 3 | pH 2 | pH 3 | pH 2 | pH 3 |
| 5 | 0 | 0 | 0 | 0 | 0 | 0 | 0 |
| | 0.5 | 8 | 5 | 8 | | 6 | 0 |
| | 1 | | 8 | 4 | 5 | 19 | 6 |
| | 5 | 3 | 3 | 7 | 7 | 76 | 3 |
| 25 | 0 | 0 | 0 | 0 | 0 | 0 | 0 |
| | 0.5 | 8 | 10 | 0 | 17 | 77 | 9 |
| | 1 | 18 | 13 | 30 | 20 | 93 | 31 |
| | 5 | 36 | 17 | 30 | | 100 | 75 |
| 37 | 0 | 0 | 0 | 0 | 0 | 0 | 0 |
| | 0.5 | 15 | 11 | 17 | 21 | 97 | 27 |
| | 1 | 35 | 13 | 21 | 18 | 100 | |
| | 5 | 75 | 26 | 72 | 15 | 100 | 94 |

In vivo mouse protection tests

Comparative animal protection tests were carried out using *Staphylococcus aureus* (Smith) as the infecting organism. The antibiotics were given intramuscularly at the time of infection and the amount of antibiotic necessary to cure half the animals was determined ($CD_{50}$). The data are listed in Table 5.

TABLE 5.—$CD_{50}$ VALUES OF PENICILLINS USING *STAPHYLOCOCCUS AUREUS* (SMITH)

Penicillin:                                  $CD_{50}$ (mg./kg.)
Alpha isomer _____ 0.85
Beta isomer _____ 0.35
"Mixture" _____ 0.18
Penicillin V _____ 0.64
Penicillin G _____ 0.60

It is of considerable interest to note that the activity of potassium 6-($\alpha$-phenoxypropionamido)pencillanate (mixture) is greater than that of even the pure beta isomer in the *S. aureus* infection. This activity has been repeatedly observed. The Table 6 is given $CD_{50}$ results from two other independently run experiments comparing intramuscularly administered 6-($\alpha$-phenoxypropionamido)penicillanate (mixture) with the pure alpha and beta isomers against *S. aureus* infection.

TABLE 6.—$CD_{50}$ VALUES USING *STAPHYLOCOCCUS AUREUS* (SMITH)

| Penicillin | $CD_{50}$ (mg./kg.) | |
|---|---|---|
| | Experiment 1 | Experiment 2 |
| Alpha isomer | 0.72 | 1.25 |
| Beta isomer | 0.60 | 0.70 |
| "Mixture" | 0.40 | 0.45 |

The compounds of the present invention may be viewed, broadly speaking, as the result of combining the single, naturally occurring optical isomer, 6-aminopenicillanic acid, with an acid which contains at least one asymmetric carbon atom as indicated by the asterisk, thus:

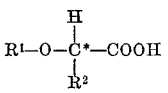

Thus, the product (amide or pencillin) when a racemic acid is used will be a mixture of two diastereoisomers. Both are biologically active and both of these isomers and mixtures thereof are included within the scope of the present invention. As illustrated above, the individual isomers are prepared in pure form by starting with the pure dextro or levo form of the acid or by physical separation of the mixture produced from the racemic acid.

I claim:

1. The process of preparing an antibacterial composition comprising a mixture of the levo and dextro isomers of potassium α-phenoxyethylpenicillin, said dextro isomer when in pure form decomposing at about 230 to 231° C. and exhibiting $[\alpha]_D^{24}$ of about +251° (c.=1 percent in water), said levo isomer when in pure form decomposing at about 238 to 239° C. and exhibiting $[\alpha]_D^{24}$ of about +218° (c.=1 percent in water), and said isomers being present in said mixture in a weight relation to one another expressable as 60 to 80% ±5% by weight of the levo isomer and conversely 20 to 40% ±5% by weight of the dextro isomer which comprises the consecutive steps of adding with agitation to mycelium-free *Penicillium chrysogenum* fermentation broth prepared without added precursor about five moles of racemic α-phenoxypropionyl chloride for each mole of 6-aminopenicillanic acid therein, said addition being made at a rate slow enough to enable the pH to be maintained at about 7.5, acidifying said reaction mixture to about pH 2, extracting the levo and dextro isomers of α-phenoxyethylpenicillin therein into about one-half volume of methyl isobutyl ketone, converting said acid penicillin to the solid potassium salt by stirring said methyl isobutyl ketone solution with concentrated aqueous potassium acetate buffer and collecting said solid salt.

2. In the process of claim 1, the process of preparing an antibacterial composition comprising a mixture of the levo and dextro isomers of potassium α-phenoxyethylpenicillin, said dextro isomer when in pure form decomposing at about 230 to 231° C. and exhibiting $[\alpha]_D^{24}$ of about +251° (c.=1 percent in water), said levo isomer when in pure form decomposing at about 238 to 239° C. and exhibiting $[\alpha]_D^{24}$ of about +218° (c.=1 percent in water), and said isomers being present in said mixture in a weight relation to one another expressable as 60 to 80% ±5% by weight of the levo isomer and conversely 20 to 40% ±5% by weight of the dextro isomer which comprises the consecutive steps of adding with agitation to mycelium-free *Penicillium chrysogenum* fermentation broth prepared without added precursor above five moles of racemic α-phenoxypropionyl chloride for each mole of 6-aminopenicillanic acid therein, said addition being made at a rate slow enough to enable the pH to be maintained at about 7.5 by the addition of sodium hydroxide, acidifying said reaction mixture to about pH 2, extracting the levo and dextro isomers of α-phenoxyethylpenicillin therein into about one-half volume of methyl isobutyl ketone, converting said acid penicillin to the solid potassium salt by stirring said methyl isobutyl ketone solution with concentrated aqueous potassium acetate buffer, collecting said solid salt and washing said salt with at least one member selected from the group consisting of methyl isobutyl ketone, butanol and acetone.

3. In the process of claim 1, the process of preparing an antibacterial composition comprising a mixture of the levo and dextro isomers of potassium α-phenoxyethylpenicillin, said dextro isomer when in pure form decomposing at about 230 to 231° C. and exhibiting $[\alpha]_D^{24}$ of about +251° (c.=1 percent in water), said levo isomer when in pure form decomposing at about 238 to 239° C. and exhibiting $[\alpha]_D^{24}$ of about +218° (c.=1 percent in water), and said isomers being present in said mixture in a weight relation to one another expressable as 60 to 80% ±5% by weight of the levo isomer and conversely 20 to 40% ±5% by weight of the dextro isomer which comprises the consecutive steps of adding with agitation at about 10–20° C. to mycelium-free *Penicillium chrysogeum* fermentation broth prepared without added precursor about five moles of racemic α-phenoxypropionyl chloride for each mole of 6-aminopenicillanic acid therein, said addition being made at a rate slow enough to enable the pH to be maintained at about 7.5 by the addition of sodium hydroxide, agitating said reaction mixture at the end of said addition of α-phenoxypropionyl chloride for at least thirty minutes, acidifying said reaction mixture to about pH 2, extracting the levo and dextro isomers of α-phenoxyethylpenicillin therein into about one-half volume of methyl isobutyl ketone, converting said acid penicillin to the solid potassium salt by stirring said methyl isobutyl ketone solution in the cold with concentrated aqueous potassium acetate buffer, collecting said solid salt and washing said salt with at least one member selected from the group consisting of methyl isobutyl ketone, butanol and acetone.

No references cited.

NICHOLAS S. RIZZO, *Primary Examiner.*